United States Patent
Gillies et al.

(10) Patent No.: US 6,253,211 B1
(45) Date of Patent: Jun. 26, 2001

(54) REPLICATION TRACKING METHOD AND APPARATUS FOR A DISTRIBUTED DATA PROCESSING SYSTEM

(75) Inventors: Graeme Sinclair Gillies, Hayling Island; Jeffery John Gosden, Fareham; Sardar Jafari-Langroudi, Southsea; Kevin John Sutton, Chichester, all of (GB)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/085,869

(22) Filed: May 28, 1998

(30) Foreign Application Priority Data

Jul. 26, 1997 (GB) .................................................. 9715737

(51) Int. Cl.[7] .................................................. G06F 17/30
(52) U.S. Cl. .............................. 707/201; 707/4; 707/10; 707/100; 709/203
(58) Field of Search .............................. 707/201, 8, 204, 707/4, 10, 100; 709/203

(56) References Cited

U.S. PATENT DOCUMENTS

| | | | | |
|---|---|---|---|---|
| 5,642,496 | * | 6/1997 | Kanfi ...................................... | 395/489 |
| 5,757,669 | * | 5/1998 | Christie et al. ................ | 364/514.006 |
| 5,758,359 | * | 5/1998 | Saxon .................................... | 707/204 |
| 5,781,910 | * | 7/1998 | Gostanian et al. .................... | 707/201 |
| 5,819,272 | * | 10/1998 | Benson ..................................... | 707/8 |

FOREIGN PATENT DOCUMENTS 2270779    3/1994  (GB) .

* cited by examiner

*Primary Examiner*—Jack Choules
*Assistant Examiner*—Cheryl Lewis
(74) *Attorney, Agent, or Firm*—A. Bruce Clay (57) ABSTRACT

Replication tracking apparatus is described for tracking replication of data in a distributed data processing system having plural application server computer systems interconnected via a network, wherein each application server has a database application having a database and means for communicating data from the database via the network to plural client computer systems and to others of the application servers. The apparatus generates an event message on detection of an absence of database replication by the application servers.

5 Claims, 7 Drawing Sheets

REPLICATION TRACKING METHOD AND APPARATUS FOR A DISTRIBUTED DATA PROCESSING SYSTEM

TECHNICAL FIELD

The present invention relates to a method and apparatus for tracking replication of data in a distributed data processing system.

BACKGROUND OF THE INVENTION

Some conventional data processing environments comprise a plurality of user terminals connected to a central host data processing system. Such data processing environments are typically referred as central or host environments.

Increasing in popularity are distributed data processing environments in which user terminals are connected to plural server data processing systems.

In both of the above examples, the cost of systems management can be measured by the ratio of administrators (or operation support staff) to users. In a typical distributed environment, such as an environment providing a Lotus Notes service or similar distributed client-server database application, the ratio is relatively high: one Lotus Notes (Lotus and Lotus Notes are trade marks of Lotus Development Corporation) administrator may have difficulty controlling over 200 users of a fully functional Lotus Notes service. By comparison, in a typical host environment such as an OfficeVision (OfficeVision is a trade mark of International Business Machines Corporation), a single administrator may comfortably control thousands of users.

In a typical distributed environment employing a distributed database management system, a group of administrators collectively perform operational tasks associated with management of servers such as Groupware and E mail servers. Both E Mail and Groupware applications usually generate megabytes of information during normal daily operation. The information is typically stored in a log format. The logs are preferably processed with a view to identifying error conditions and thus to eliminating or at least reducing application server failures. However, the processing of such logs is a laborious activity. It would, therefore, be desirable to improve automation of server management in a distributed environment.

SUMMARY OF THE INVENTION

In accordance with the present invention, there is now provided replication tracking apparatus for tracking replication of data in a distributed data processing system having plural application server computer systems interconnected via a network, each application server having a database application having a database and means for communicating data from the database via the network to plural client computer systems and to others of the application servers, the apparatus comprising means for generating an event message on detection of an absence of database replication by the application servers.

Preferably, the generating means comprises: sampling means for sampling each copy of the database; first comparison means for determining whether corresponding samples match each other; and second comparison means for generating the event message if the number of matches identified by the first comparison means is less than a predefined acceptance threshold.

In preferred embodiments of the present invention, there is provided an administration terminal having means for displaying the event message.

It will be appreciated that the present invention extends to a distributed data processing system comprising plural application server computer systems interconnected via a network, each application server having a database application having a database and means for communicating data from the database via the network to plural client computer systems and to others of the application servers; and, replication tracking apparatus as hereinbefore described.

Viewing the present invention from another aspect there is provided, a method for tracking replication of data in a distributed data processing system having plural application server computer systems interconnected via a network, each application server having a database application having a database and means for communicating data from the database via the network to plural client computer systems and to others of the application servers the method comprising the step of generating an event message on detection of an absence of database replication by the application servers.

BRIEF DESCRIPTION OF THE DRAWINGS

Preferred embodiments of the present invention will now be described, by way of example only, with reference to the accompanying drawings, in which.

DETAILED DESCRIPTION OF THE PREFERRED EMBODIMENTS

Figure 1:
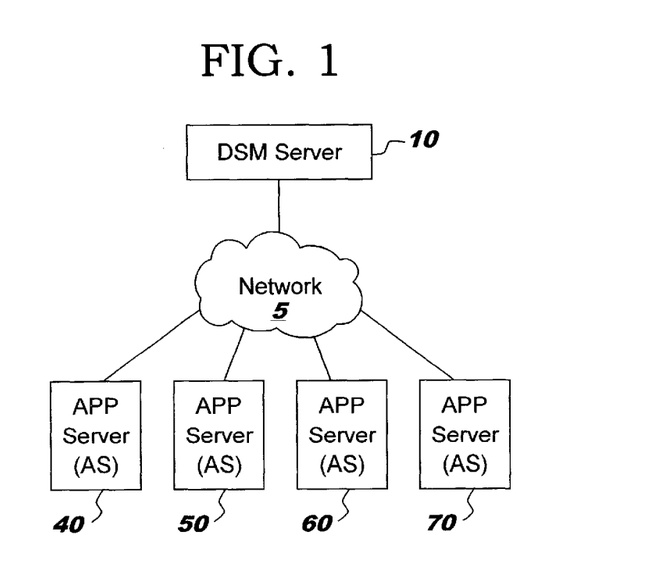
FIG. 1 is a block diagram of a distributed data processing system.

Referring first to FIG. 1, a distributed data processing system embodying the present invention comprises a plurality of application server computer systems 40–70 and a Distributed Systems Monitor (DSM server computer system 10 all interconnected via a network 5.

Figure 2:
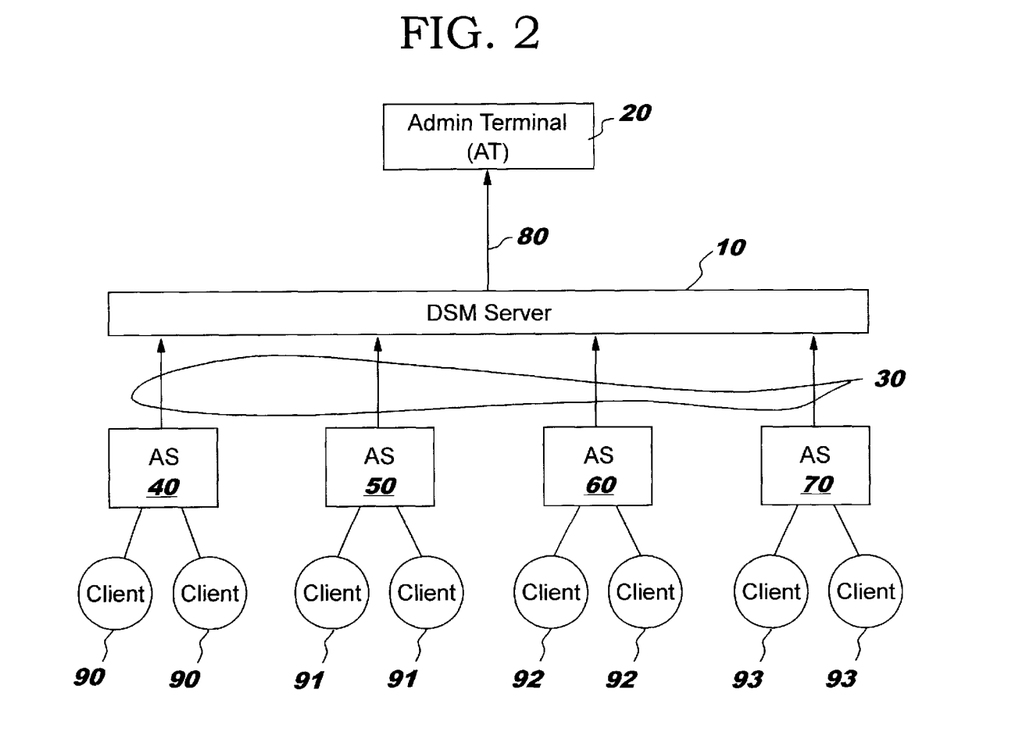
FIG. 2 is more detailed block diagram of the data processing system of FIG. 1.

With reference now to FIG. 2, each application server 40–70 provides a service to a set of client user terminals 90–93. The DSM server 10 is also connected to an administration terminal 30.

Figure 3:
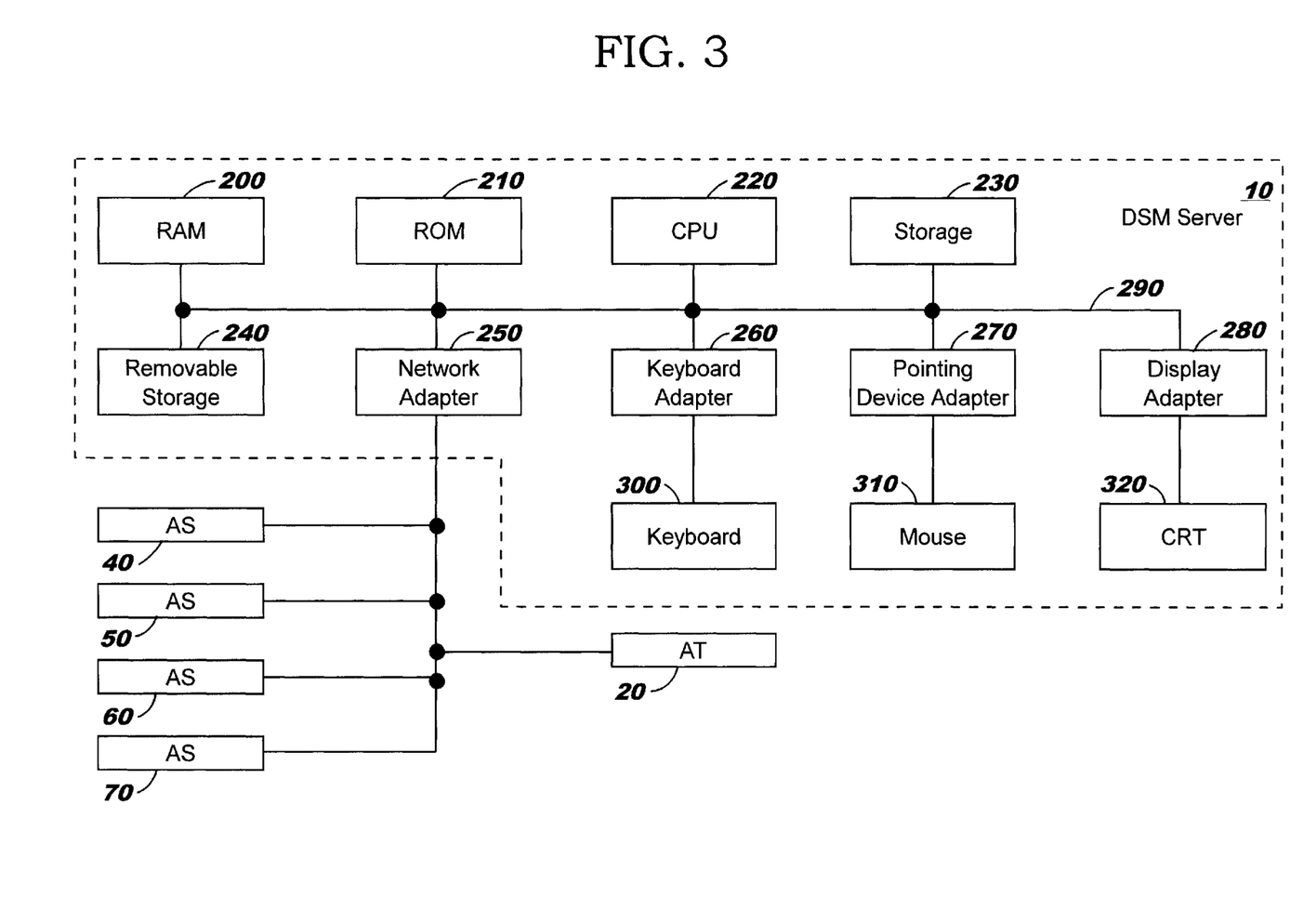
FIG. 3 is a block diagram of a DSM server of the system shown in FIG. 2.

Referring to FIG. 3, the DSM server 10 comprises a system random access memory (RAM) 200, a system read only memory (ROM) 210, a central processing unit (CPU) 220, a mass storage device 230 comprising one or more large capacity magnetic disks or similar data recording media, one or more removable storage means 240 such as floppy disk drives, CD ROM drives and the like, a network adaptor 250, a keyboard adaptor 260, a pointing device adaptor 270, and a display adaptor 280, all interconnected via a bus architecture 290. The CPU 220 is a Pentium 100 MHz central processor (Pentium is a trade mark of Intel Corporation). It will be appreciated that other embodiments of the present invention may employ an equivalent to a Pentium 100 MHz CPU to perform the function of CPU 220. The RAM 200 is at least 48 megabytes in capacity. A keyboard 300 is coupled to the bus architecture 290 via the keyboard adaptor 260. Similarly, a pointing device 310, such as a mouse, touch screen, tablet, tracker ball or the like, is coupled to the bus architecture 290 via the pointing device adaptor 270. Equally, a display output device 320, such as a cathode ray tube (CRT) display, liquid crystal display (LCD) panel, or the like, is coupled to the bus architecture 290 via the display adaptor 280. Additionally, the DSM server 10 is coupled to the terminal 20 and the servers 40–70 via the network adaptor 250.

Basic input output system (BIOS) software is stored in the ROM 210 for enabling data communications between the CPU 220, mass storage 230, RAM 200, ROM 210, removable storage 240, and adaptors 250–280 via the bus architecture 290. Stored on the mass storage device 230 is operating system software and application software including DSM software. Further application software may be loaded into the DSM server 10 via the removable storage 240 or the network adaptor 280. The operating system software enables the DSM server 10 to select and run the application software. The application software stored in the DSM server 10 includes Lotus Notes Release 4. Lotus Notes 4 is a document-based database management system. Further details of Lotus Notes 4 can be found in *Mastering Lotus Notes 4* by Brown, Brown, Koutchouk and Brown, published in 1996 by Sybex, Inc. As will be described shortly, in operation, the DSM server 10 employs Lotus Notes 4 to communicate with the application server 40–70.

It will be appreciated that, in some embodiments of the present invention, terminal 20 may be integral to the DSM server 10, with monitoring and control functions of the terminal 20 facilitated via the display 320 and the input devices 300 and 310 of DSM server 10.

Figure 4:
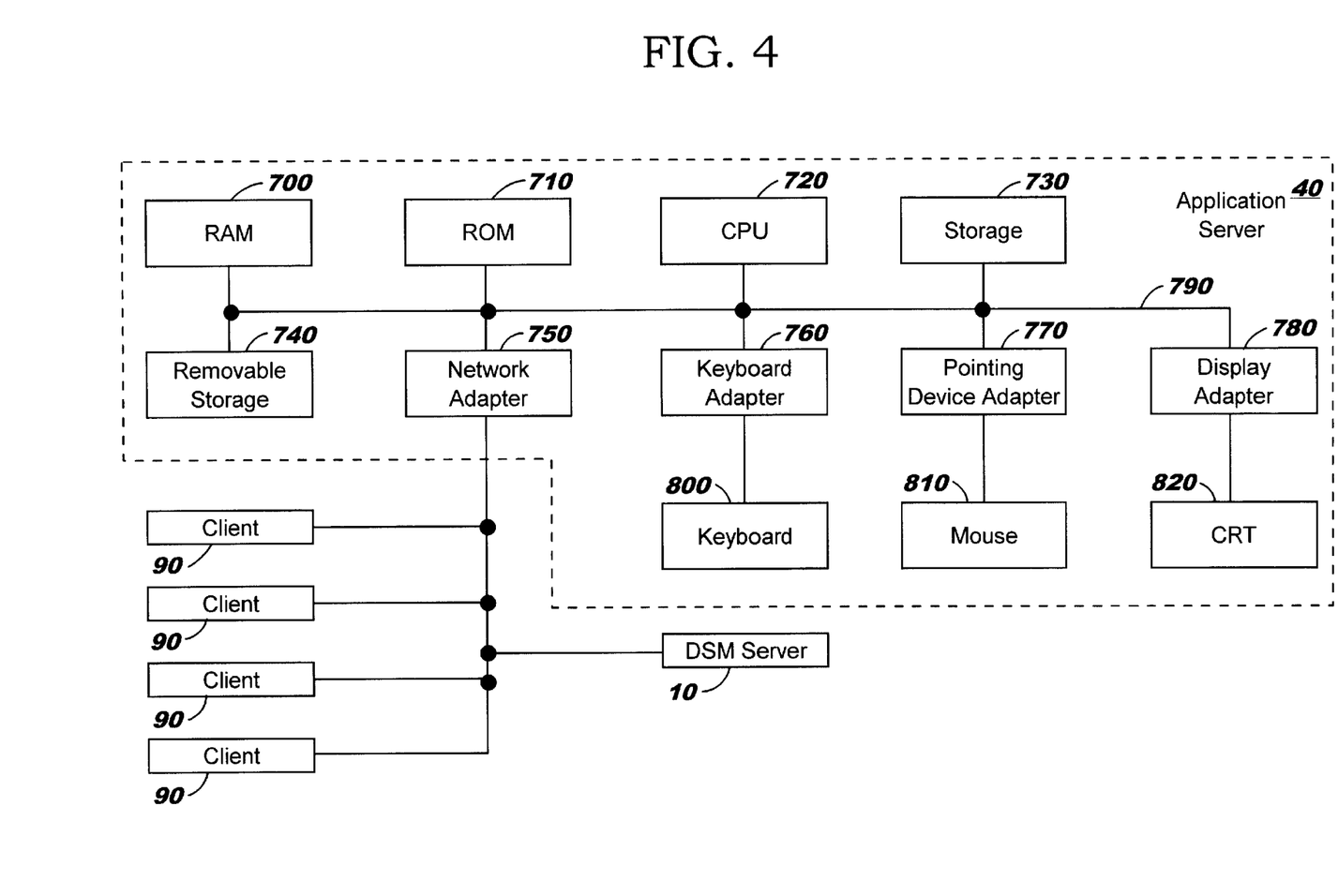
FIG. 4 is a block diagram of an application server of the system shown in FIG. 2.

Referring to FIG. 4, each application server 40–70 comprises a system random access memory (RAM) 700, a system read only memory (ROM) 710, a central processing unit (CPU) 720, a mass storage device 730 comprising one or more large capacity magnetic disks or similar data recording media, one or more removable storage means 740 such as floppy disk drives, CD ROM drives and the like, a network adaptor 750, a keyboard adaptor 760, a pointing device adaptor 770, and a display adaptor 780, all interconnected via a bus architecture 790. The CPU 720 may be an Intel Pentium 100 MHz central processor or equivalent. A keyboard 800 is coupled to the bus architecture 790 via the keyboard adaptor 760. Similarly, a pointing device 810, such as a mouse, touch screen, tablet, tracker ball or the like, is coupled to the bus architecture 790 via the pointing device adaptor 770. Equally, a display output device 820, such as a cathode ray tube (CRT) display, liquid crystal display (LCD) panel, or the like, is coupled to the bus architecture 790 via the display adaptor 780. Additionally, the each application server 40–70 is coupled to the DSM server 10 and to remote client terminals 90 via the network adaptor 750.

Basic input output system (BIOS) software is stored in the ROM 710 for enabling data communications between the CPU 720, mass storage 730, RAM 700, ROM 710, removable storage 740, and adaptors 750–780 via the bus architecture 790. Stored on the mass storage device 730 is operating system software and application software. The application software includes a distributed client-server database application such as Lotus Notes 4 and Lotus cc:Mail. In operation, each application server 40–70 employs the resident client-server data-base application to communicate with both the remote client terminals 90–93 and the DSM server 10. Further application software may be loaded into each application server 40–70 via the removable storage 740 or the network adaptor 780. In operation, the operating system software enables each application server 40–70 to select and run the application software.

Referring back to FIG. 2, the application server 40 is a cc:Mail server running Lotus cc:Mail on the OS/2 operating system platform (OS/2 is a trade mark of International Business Machines Corporation) produced by International Business Machines Corporation to provide cc:Mail services to users of the connected client terminals 90. The application server 50 is a Notes server running Lotus Notes 4 on the Windows Server NT operating system (Windows and Windows NT are trade marks of Microsoft, Inc) produced by Microsoft Inc to provide Notes services to users of the connected client terminals 91. The application server 60 is a Notes server running Lotus Notes 4 on the OS/2 operating system to provide Notes services to users of the connected client terminals 92. The application server 70 is a Notes server running Lotus Notes 4 on the UNIX or AIX operating systems (UNIX is licensed exclusively through X/Open Company Limited; AIX is trade mark of International Business Machines Corporation) to provide Notes services to users of the connected client terminals 93. It will be appreciated that, in other embodiments of the present invention, there may be more or less than four application servers operating on any one or more of the aforementioned or different operating system platforms.

DSM Server: General

It will be appreciated from FIG. 2 that the DSM server is located in terms of system hierarchy, between the application servers 40–70 and the administration terminal 20. In operation the DSM Server operates as a mid-level systems manager. In operation, the application servers 40–70 record data transfers in which they are involved, such as message and E Mail to or from the connected client terminals 90–93, in log files. The log files maintained by the application servers 40–70 are directed to the DSM server 10. The DSM server 10 processes the received log files to reduce the amount of reporting information sent to the administration terminal 20. Provided that the application servers 40–70 can route such log files to the DSM server 10, and, in the case of Notes server 50–70, employ the Notes communication protocol, the operating system platform is not relevant.

Figure 5:
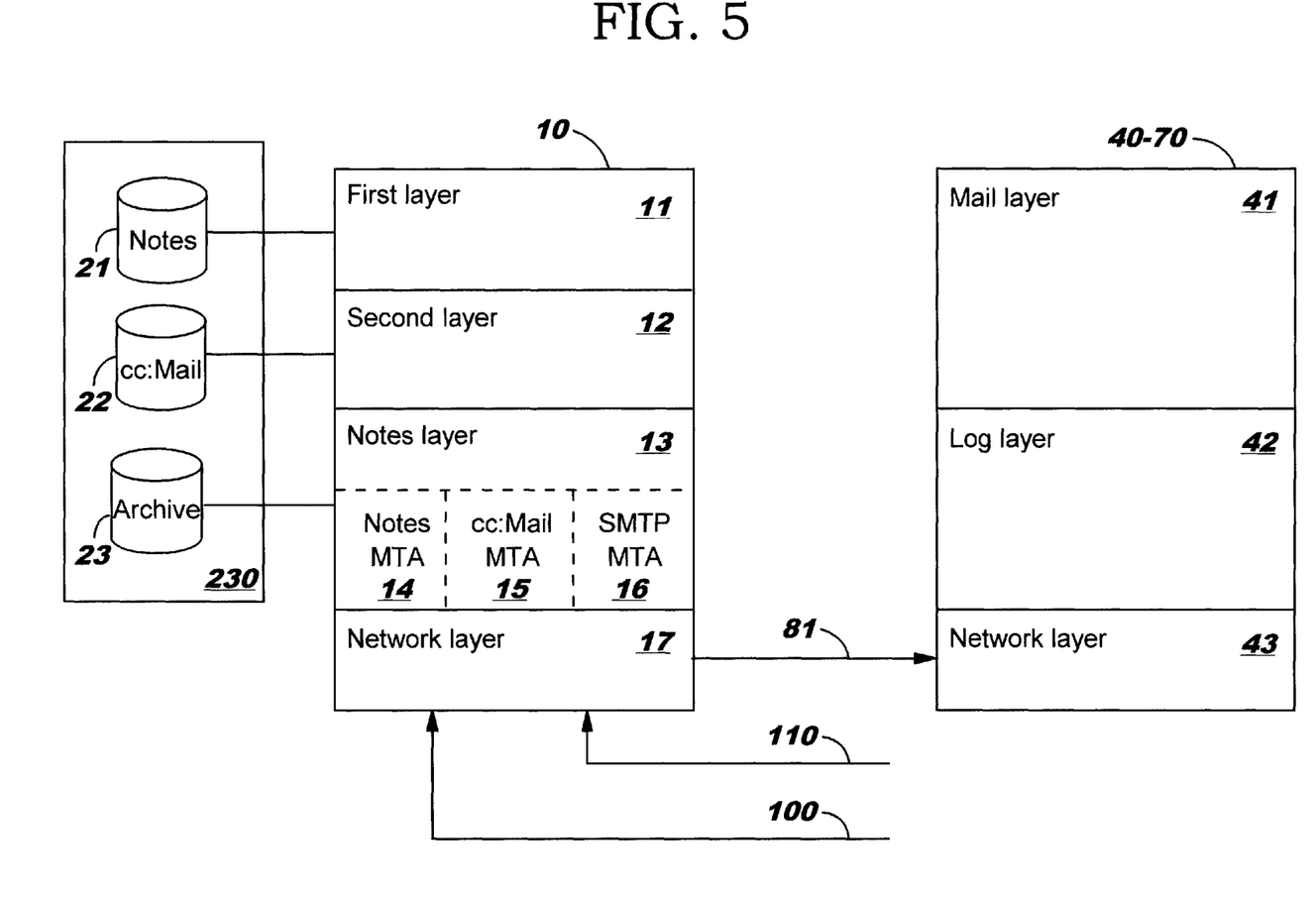
FIG. 5 is a block diagram of a high level architecture for the DSM server.

Referring now to FIG. 5, the high level architecture of the DSM server 10 comprises a first layer 11 for performing Process, Action, Notify and Report functions. Below the first layer 11 is a second function layer 12 for performing Log, Analyze and Filter functions. Below the second layer 12 is a Lotus Notes layer 13. In operation, the Notes layer 13 enables the DSM server 10 to communicate with the application servers 50–70. To facilitate such communication, the Notes layer 13 includes a Notes mail message transfer agent (MTA) 14, a cc:Mail MTA 15, a Simple Message Transfer Protocol (SMTP) mail MTA 16, and an X.400 mail MTA (not shown). The message transfer agents avoid the need to include special mail gateways to communicate with mail systems which are foreign to Notes. Below the Notes layer 13 is a network layer 17 for interfacing the DSM monitor 10 with the application servers 40–70. The mass storage 230 comprises a Notes data store 21, a cc:Mail store 22, and an archive data store 23. Data from the application servers 40–70, such as STATREP and LOG.NSF files 110 or other mail system log files 100, is received in the DSM server 10 at the network layer 17 and passed via the MTAs 14–16 of the Notes layer 13 to the second layer 12 where it is processed by the Log, Analyze, and Filter functions. The Log function records incoming data in the mass storage 230. The filtered data is passed from the second layer 12 to the first layer 11 where the data is processed by the Process, Action, Notify and Report functions. The Action function may generate, in response to the received data, corrective instructions 81 which are returned to the application server 40–70. Depending on system configuration a delay may be imposed in the passage of data from the second layer 12 to the first layer 11 in relation to one or more of the functions therein. For example, in some embodiments of the present invention, the Report function may be set to activate only once a week, with the data to reported remaining logged in the mass storage 230 until a report is due. The high level architecture of each of the application servers 40–70 comprises a mail layer 41 providing Notes or cc:Mail functionality on an OS/2, NT or AIX operating system platform as the case may be. Below the mail layer 41 is a log layer 42 for supplying log files to the DSM server 10. Below the log layer 42 is a network layer 43 for interfacing with the network layer 17 of the DSM server 10.

Lotus Collection Agent

Figure 6:
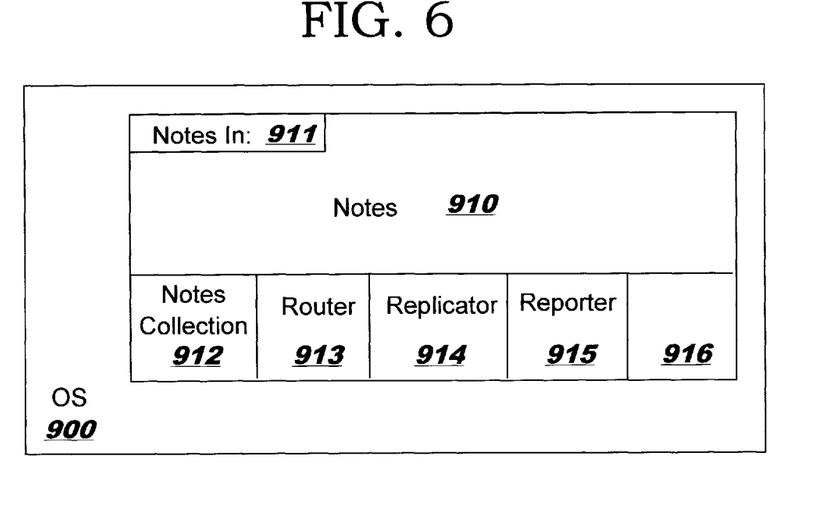
FIG. 6 is a block diagram of software stored in an application server of the system shown in FIG. 2.

Referring to FIG. 6, each Notes application server 50–70 runs Notes 910 on an operating system 900 such as AIX, OS/2, or NT operating system. In each Notes application server 50–70, Notes 910 comprises a NOTES.INI file 911 and a plurality of Notes tasks 913–916. The tasks 913–916 include a Router task 913, a Replicator task 914, and a Reporter task 915. In addition, each Notes application server 50–70 includes a Notes collection agent 912. The Notes collection agent 912 operates as a task within Notes 910. The NOTES.INI file defines the tasks which are to be started in Notes 910 when the host Notes application server 50–70 is booted. The Notes collection agent 912 is specified within the NOTES.INI file. Thus, the Notes collection agent 912 is active whenever the host application servers 50–70 is operational. When active, the Notes collection agent 912 enables the DSM server 10 to communicate with the Notes applications servers 50–70 via the Notes protocol. The Notes application servers 50–70 send their respective operational statistics to a database file called LOG.NSF. At definable intervals, the Notes collection agent 912 copies information from the LOG.NSF to an intermediate database, from which the information is formatted and mailed via the Notes layer 41 to the DSM server 10 as represented by 110 in FIG. 5. The information collected from each Notes application server 50–70 falls into one of four categories: log data, server tasks, e mail routing, and replication. For each category, the user can select one of the options:

1) Collect and process all documents in that category (default);
2) Collect all documents of this type now, but process them later; and,
3) Discard all documents of this category.

The user can change the action for any document category at any time. The Notes collection agent 912 maintains a time and date stamp to record the last successful poll of the LOG.NSF file. This stamp is recorded in the NOTES.INI file 911. If one of the tasks 913–916 is started with either no or an invalid time stamp, the Notes collection agent 912 will create it before processing any data. The parameters used by the Notes collection agent 912 can be viewed and configured via each of the Notes servers 50–70. Statistics can also be recorded in the STATREP database and routed to the DSM server 10 for processing as also represented by mail flow 110 in FIG. 5.

cc:Mail Collection Agent

Application server 40 acts as a cc:Mail Post Office router. The DSM server 10 appears to application server 40 as a peer Post office via the cc:Mail MTA 16. Application server 40 further comprises a cc:Mail collection agent. The cc.Mail collection agent and the cc:Mail MTA 16 in combination enables cc:Mail log files to be mailed by application server 40 to the DSM server 10. The cc:Mail collection agent is similar in function to the Notes collection agent 912 hereinbefore described. In operation, the cc:Mail MTA 16 and cc:Mail collection agent cooperate in gathering cc:Mail router log data from application server 40 and in routing such log data to the DSM server 10 without interrupting normal Router function. This process operates as a cc:Mail call list entry through which cc:Mail logs are collected and supplied to the DSM server 10 at predefined intervals. This enables the DSM server 10 to process these log files off-line from the cc:Mail message router service provided by application server 40.

DSM Server Functions

Figure 7:
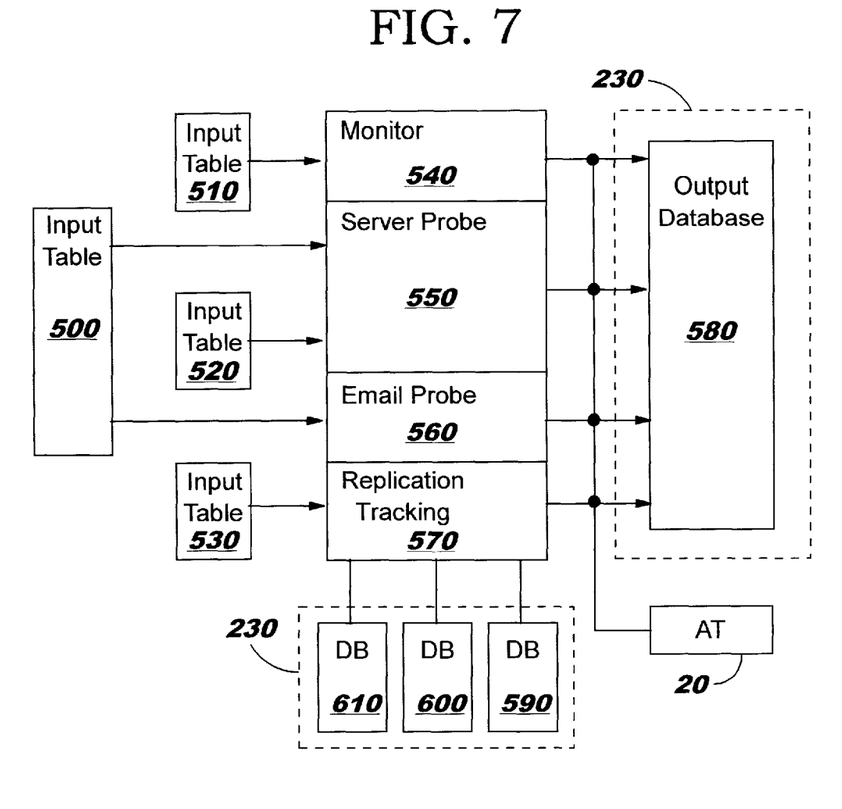
FIG. 7 is a functional block diagram of the DSM server.

Referring now to FIG. 7, in operation, the DSM server 10 acts as a mid-level system manager for managing the activities of the application servers 40–70. To facilitate such management, the first layer 11 of the DSM architecture includes the following Process functions:

a) a Monitor function 540;
b) a Server Probe function 550;
c) an E Mail Probe function 560; and
d) a Database Replication Tracking function 570.

The functions 540–570 are performed by the CPU 220 when configured by corresponding software retained in the mass storage 230 of the DSM server 10. It will be appreciated that, in other embodiments of the present invention, similar functionality may be provided by hardware or by a combination of hardware and software.

Referring back to FIG. 2, the log files maintained by the application servers 40–70 are directed to the DSM server 10 as generally represented by communication paths 80. The log files are stored by DSM server 10 in mass storage 230. The log file corresponding to each application server 40–70 is stored on a separate disk of mass storage 230.

Returning to FIG. 7, on receipt of the log files, the Monitor function 540 of the DSM server 10 filters the messages contained in each log. The filtered messages are sent from the DSM server 10 to the terminal 20 for display to an administrator as generally represented in FIG. 2 by 90. The Server probe function 550 and the Mail probe function 560 automatically operate selected ones of the application servers 40–70. The integration of the functions 540–570 within the DSM server 10 enables the DSM server 10 to analyze message log files produced by the application servers 40–70; identify operational problems within the application server 40–70; identify message routing problems within the environment; and, store the log files of the application servers 40–70.

Each function 540–570 is associated with one or more of a plurality of input tables 500–530. Specifically, input table 500 is associated with server probe function 550 and the e mail probe function 560; input table 510 is associated with the monitor function 510; input table 520 is associated with the server probe function 550; and input table 530 is associated with data base replication tracking function 570. The outputs of the functions 540–570 are supplied to database 580 stored in the mass storage 230 and to the administration terminal 20. The data base replication tracking function 570 also monitors data bases 610, 600, and 590 stored in the mass storage 230. The input tables 500–540 contain thresholds and parameters specified by system management staff. The thresholds and parameters relate to boundaries or levels of service agreed with an end user. For example, if mail is expected to be delivered within 3 minutes under a service level agreement, this level will be set as the threshold in the probe input table 500 for input to the e mail probe function 570. If a mail delivery exceeds this time, e mail probe generates an alert. A report of this incident is then recorded in an output report database stored in the mass storage 230.

Monitor Function

Conventionally, log files from application servers are seldom thoroughly examined and acted upon in a practical environment because, as mentioned earlier, such activity is time consuming when performed manually. Referring back to FIG. 1, as mentioned earlier, all server log files are routed from the application servers 40–70 to the DSM server 10. The DSM server 10 comprises a knowledge base stored in the mass storage 230. The knowledge base enables the monitor function 540 of the DSM server 10 to analyze the contents of the log files received from the application servers 40–70 and decide what action, in each case, is appropriate. The analysis is a continuous, ongoing activity, with the DSM server 10 acting upon the information analyzed by the monitor function 540 on behalf of the administrator; filtering and relaying messages from the application servers 40–70 to the administration terminal 20. The monitor function 540 can be configured to filter out only selected items from the log files for transmission to the adminstration terminal 20. This feature can be employed to prevent trivial information from reaching the administration terminal 20, thereby allowing administration staff to react more swiftly to critical messages.

Error messages contained in the log files from the application servers 40–70 (eg: communications, router, security, resource, and server environment error messages) are captured and reported by the DSM server 10 via Notes mail, Simple Network Management Protocol (SNMP) trap Protocol Data Units (PDUs), and logging to a Notes database. Control of the application servers 40–70 can be passed to predefined user exits with the DSM server 10 when the above alerts are processed.

Each application server 40–70 corresponds to a different dedicated disk in the mass storage 230 of the DSM server 10. The dedicated disk is employed to record all information relevant to the corresponding application server 40–70. Specifically, the information is organised by the DSM server 10 in a standard format with sub-directories named DATA, STATUS, and REPORTS.

A summary status file is created by the DSM server 10 and stored in the STATUS sub-directory for access by administration staff wishing to review the latest activities of the application servers 40–70. A Graphical User Interface (GUI) provided by Notes 4 enables administration staff to view all information collected by the DSM server 10 from the application servers 40–70 via a database navigator.

Information from server logs and statistics may be summarised on a weekly and monthly basis to provide administrators with information to manage present data processing requirements and plan for future demands. The information is held on a Notes database in the form of Notes statistics, operation system statistics, network statistics, and response time summaries. The application server log files and statistics can be archived via the DSM server 10 automatically on a monthly basis to a desired destination.

Server Probe Function

The server probe function 550 monitors, via the Notes collection agent 912, each Notes application server 50–70 to ensure activation of the Notes tasks 913–916 specified in the NOTES.INI file of each Notes application server 50–70 Tasks 913–916 which are not running (perhaps due to failure) are started automatically by the server probe function 550. In addition, the server probe function 550 records and summarises, via the Notes collection agent 912 in each Note application server 50–70, response times from the DSM server 10 to the Notes application servers 50–70 on a daily basis.

If any of the Notes application servers 50–70 goes off-line for any reason, the server probe function 550 will raise a severity 1 alert. The severity 1 alert is sent by the DSM server 10 to the administration terminal 20. The server probe function 550 continuously checks, via the Notes collection agent 912, that the specified tasks 913–916 are active and functioning correctly. In the event of a problem with any of the tasks 913–916, the server probe function 550 will automatically attempt to restart it via the Notes collection agent 912. After a predefined number of failed attempts to restart a particular task 913–916, the server probe function 550 routes an alert to the adminstration terminal 30. Failure of the host application server 50–70 is recorded by the DSM server 10 both within and beyond committed service time.

The server probe function 550 will now be described with reference to the flow chart of FIG. 8. In operation, the server probe function 550 issues commands in Notes protocol to a target application server 50–70. The commands issued by the server probe function 550 are handled within Notes 910 by the Notes collection agent 912 of the target application server 50–70. Initially, at block 1000, the server probe function 550 reset a restart count to zero. Then, at block 1010, the server probe function 550 sends a "show task configuration" command to the Notes collection agent 912. The "show task configuration" command captures from the NOTES.INI file in the target application server 50–70 the tasks 913–916 which should be active. At block 1020, the server probe function 550 sends a "show active tasks" command to the target application server 50–70. The "show active tasks" command captures the tasks 913–916 which are active on the target application server 50–70. At block 1030, the server probe function 550 compares the task configuration with the active tasks. If the task configuration is the same as the active tasks, then the server probe function 550 terminates at block 1080. If the task configuration is different from the active tasks, indicating the one or more of the tasks 913–916 has failed, then, at block 1040, the server probe function 550 determines if the restart count equals a predetermined threshold of attempts to restart the failed tasks. If so, then, at block 1040, the server probe function 550 issues an alert message for supply to the administration terminal 20. If not, then at block 1050, the server probe function increments the restart count and, at block 1060, attempts to restart those tasks specified in the task configuration which were reported as inactive. The server probe function then continues around the loop defined by blocks 1020, 1030, 1040 1060, and 1070 until either all required tasks are active or the threshold is exceeded.

E-Mail Probe Function

The E Mail probe function 560 tests mail routes in the network of Notes application servers 50–70 by measuring the time taken for a test message in the form of a Lotus Notes document to complete a return trip to a reflecting server 50–70 against predefined thresholds. An example of a test report produced by the E Mail probe function 560 is provided in Appendix A hereto. The E Mail probe function 560 generates an alert if a threshold is exceeded. Additionally, the E Mail probe function 560 generates reports including elapsed time across each E Mail application server en route. Specifically, the E Mail probe acquires the local date and time from each server 50–70 both on entry and exit. The entry and exit date and time for each server are recorded in the Notes document forming the test message. In any mail application, it is important for administration staff to know if there are any mail delivery problems and the time taken to deliver the mail. The E Mail probe function converts any problems arising in the Notes mail network into alerts for forwarding to the adminstration terminal 20. The E Mail probe function 560 also automatically generates Mail tracking reports.

Replication Tracking Function

In some Notes applications it is important that data stored in databases is shadowed between different application servers 50–70. Such shadowing can be achieved via the Notes replication task 914. The Notes replication tracking function 570 of the DSM server 10 checks databases on the application servers 40–70 to establish if they are synchronised after a Notes replicator task 914 has been executed by two or more of the Notes application servers 50 to 70. If the databases are out of synchronisation, the DSM server 10 sends an alert to the administration terminal 20. The Notes replication tracking function 570 verifies that, after Notes replication server activity has occurred, databases of the same replica ID have the same contents.

By way of example with reference to FIG. 1, suppose a database ABC.NSF is stored on application server 50 and replicated on application server 60 via the replication tracking task 914. Hence, both application server 50 and application server 60 hence store a copy a ABC.NSF. Suppose now that a client user connected to application server 50 is modifying the copy of ABC.NSF stored on application server 50 and, simultaneously, a client user connected to application server 60 is modifying the copy of ABC.NSF stored on application server 60. The replication task 914 on application 50 periodically replicates the modified copy of ABC.NSF on application server 60. Likewise, the replication task 914 on application 60 periodically replicates the modified copy of ABC.NSF on application server 50. The frequency at which replication takes place can be preset according to user needs. For example, if the database contain relatively important information which is frequently modified by client users, then correspondingly frequent replication activity might be appropriate. Conversely, if the information contained in the database in less important, replication may be set to take place less frequently. From a systems management perspective, it would be desirable to ensure that replication tasks on application servers 50 and 60 are set to perform replication of ABC.NSF at sufficient frequency to accommodate the regularity with which end user clients of application servers 50 and 60 independently modify ABC.NSF. This problem is solved by the replication tracking function 570 of the DSM server 10.

Figures 8, 9:
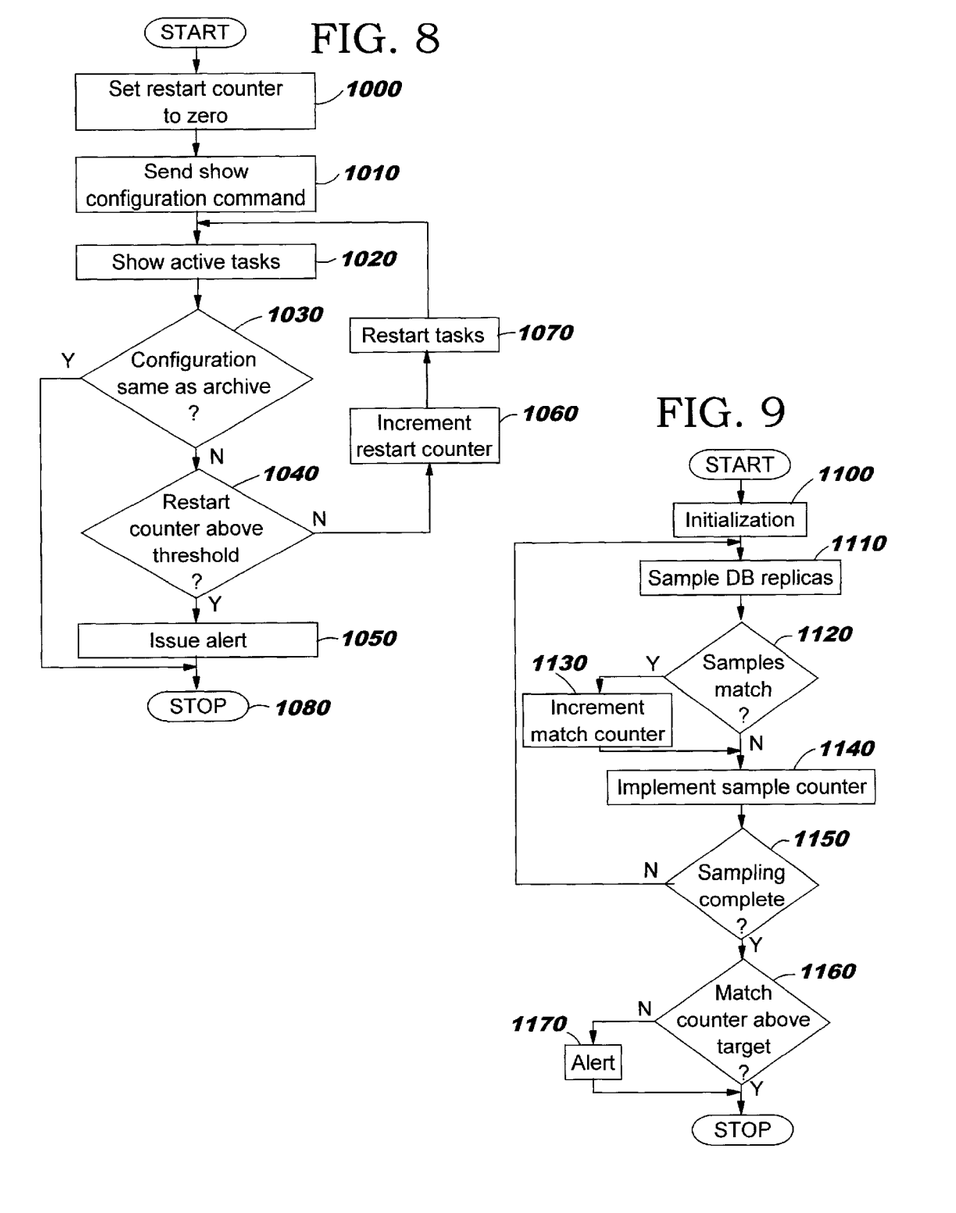
FIG. 8 is a block diagram of a server probe function of the DSM server in the form of a flow chart.
FIG. 9 is a block diagram of a mail probe function of the DSM server in the form of a flow chart; and, FIG. 10 is a block diagram of another distributed data processing environment embodying the present invention.
Figure 10:
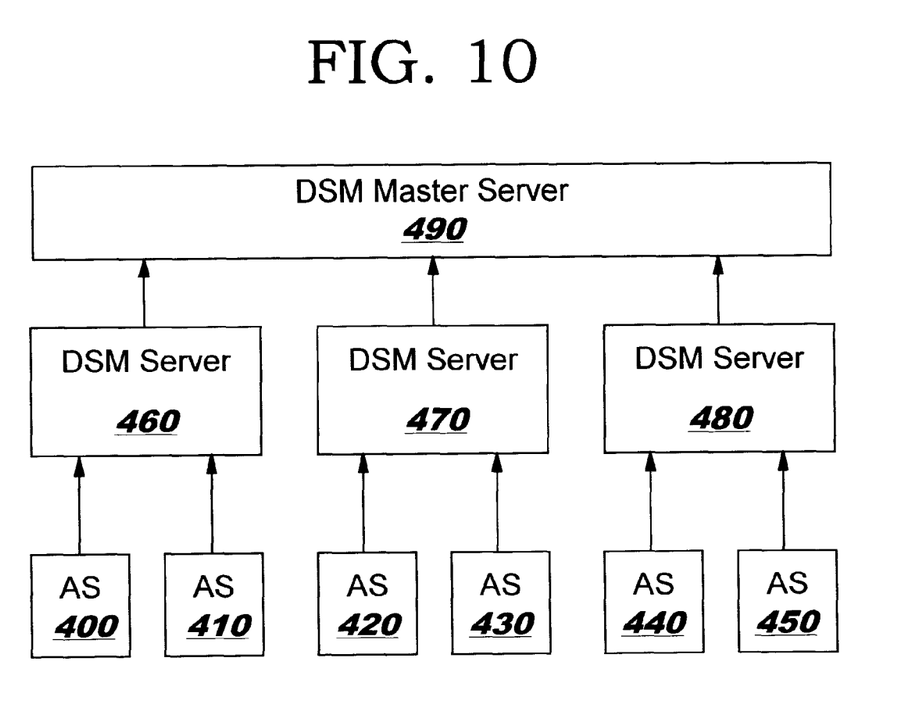

Referring to FIG. 9, in operation, the replication tracking function 570 is initialised, at block 1110, by setting a SAMPLING INTERVAL to the desired number of samples of the copies of ABC.NSF on application servers 50 and 60 to be taken; by setting a TARGET COUNT to the number of matches in the copies of ABC.NSF on application servers 50 and 60 to be found in the sampling interval; and, by resetting running totals HIT COUNT and SAMPLE COUNT to zero. At block 1110, the replication tracking function 570 samples both ABC.NSF stored on application 50 and ABC.NSF stored on application server 60. At block 1120, the replication tracking function 570 compares the two samples. If the two samples match, then, at block 1130 the replication tracking function 570 increments HIT COUNT and progresses to block 1140. If the two samples do not match, then the replication tracking function progresses directly to block 1140, at which SAMPLE COUNT is incremented. At block 1150, the replication tracking function 570 compares SAMPLE COUNT with SAMPLING INTERVAL. If SAMPLE COUNT does not equal SAMPLING INTERVAL, then the replication tracking function 570 returns to block 1110 to collect the next pair of Is samples. If the SAMPLE COUNT has reached SAMPLING INTERVAL, then the replication tracking function 570 compares, at block 1160, HIT COUNT with TARGET COUNT. If HIT COUNT is less than TARGET COUNT then, at block 1170, the replication tracking function 570 issues an alert to the administration terminal indicating that the copies of ABC.NSF stored on application server 50 and 60 are not synchronised. Otherwise, the replication tracking function 570 terminates.

It will be appreciated that the replication tracking function 570 may be employed to track replication of more than one database. Equally, it will be appreciated that the replication tracking function 570 may be employed to track replication of more than two copies of the or each database. Furthermore, it will be appreciated that the replication tracking function 570 may apply different test parameters (eg: SAMPLING INTERVAL, TARGET COUNT) to different databases or groups of databases. Still furthermore, it will be appreciated that the samples forming the sampling interval may be taken over a relatively short period of time or over a relatively long period of time depending on customer requirements.

Application Server Log Data Storage

Because, in embodiments of the present invention, the log files are retained by the mass storage 230 of the DSM server 10 rather than by the application servers 40–70, the application servers 40–70 are able to dedicate more resource to client activities.

DSM Server Hierarchy and Scalability

The DSM server 10 can operate as a module. Therefore, multiple DSM servers may be employed to accommodate a large number of different application servers, with each DSM server serving a different group of application server. Referring now to FIG. 5, in an example of such an arrangement, there is provided a plurality of application servers 400–450 and a plurality of DSM servers 460–480. Each DSM server 460–480 is connected to a different group of application servers 400–450. The DSM servers 460–470 are each connected to a DSM master server 490. In operation, all MTA communications with the application servers 400–450 are handled by the DSM servers 460–480, but the DSM servers 460–480 communicate with the master DSM server 490 via the Notes MTA alone. In the example of the present invention hereinbefore described with reference to FIG. 1, there are 3 DSM servers 460–480. However, it will be appreciated that, in other embodiments of the present invention, there may be only two DSM servers reporting to the master DSM server 490. Likewise, in other embodiments of the present invention, there may be grater than three DSM servers either reporting to the master DSM server 490 or to one or more further layers of intermediate DSM servers arranging in a hierarchical structure ending at the master DSM server 490.

Typically, operational centres are consolidated into one or two geographical areas in the interests of cost. This means that from relatively few operational centres, systems management control is exercised over relatively large regions. The arrangement shown in FIG. 5 is particularly suitable for this scenario.

By way of summary then, what has been hereinbefore described by way of example of the present invention is replication tracking apparatus for tracking replication of data in a distributed data processing system having plural application server computer systems interconnected via a network, wherein each application server has a database application having a database and means for communicating data from the database via the network to plural client computer systems and to others of the application servers. The apparatus generates an event message on detection of an absence of database replication by the application servers.

second comparison means for generating said event message if a number of matches counted by said first comparison means is less than an acceptance threshold representative of said predetermined amount of synchronization.

2. Apparatus as claimed in claim 1, further comprising an administration terminal having means for displaying the event message.

3. A distributed data processing system comprising plural application server computer systems interconnected via a network, each application server having a database applica-

APPENDIX A

DSM Mail Probe Status Information for
D06ML002/06/M/IBM
Basic Information

| | |
|---|---|
| Mail Probe Reflector Name | Joe Public/UK/IBM@IBMGB@GBLP0000 |
| Time Taken For Mail Probe to Return | 957 seconds |
| Number of Server(s) Mail Probe Was Routed Through | 12 |
| Domains That The Mail Probe Passed Through | IBMGB, UNGNAMIG, GBLP0000 |

Detailed Information

\>\> denotes times for Mail Probe on its journey to the Reflector
<< denotes times for Mail Probe on its journey back from the Reflector

| Notes Server Name | Time Mail Probe Entered MAIL.BOX On Server | Time Mail Probe Left MAIL.BOX On Server | Time Mail Probe Spent At Server |
|---|---|---|---|
| GBLPR403/BGLPR4 | 12-02-97 04:34:24 PM | 12-02-97 04:34:25 PM | 1 second(s).>> |
| GBLPR401/GBLPR4 | 12-02-97 04:37:52 PM | 12-02-97 04:53:35 PM | 943 second(s).>> |
| GBMP0028/LCS | 12-02-97 04:47:12 PM | 12-02-97 04:47:15 PM | 3 second(s).>> |
| DSMLN003/UKGNAMIG | 12-02-97 04:50:47 PM | 12-02-97 04:50:49 PM | 2 second(s).>> |
| D06HUBM1/06/H/IBM | 12-02-97 04:47:35 PM | 12-02-97 04:47:36 PM | 1 second(s).>> |
| D06ML002/06/M/ABM | 12-02-97 05:51:14 PM | 12-02-97 05:51:15 PM | 1 second(s).>> |
| D06ML002/06/M/IBM | 12-02-97 05:51:15 PM | 12-02-97 05:51:15 PM | 0 second(s).>> |
| D06HUBM1/06/H/IBM | 12-02-97 04:47:37 PM | 12-02-97 04:47:38 PM | 1 second(s).>> |
| DSMLN003/UKGNAMIG | 12-02-97 04:50:51 PM | 12-02-97 04:50:53 PM | 2 second(s).>> |
| GBMP0028/LCS | 12-02-97 04:47:21 PM | 12-02-97 04:47:22 PM | 1 second(s).>> |
| GBLPR401/GBLPR4 | 12-02-97 04:53:44 PM | 12-02-97 04:53:48 PM | 4 second(s).>> |
| GBLPR403/GBLP34 | 12-02-97 04:50:21 PM | 12-02-97 04:50:21 PM | 0 second(s).>> |

What is claimed is:

1. Replication tracking apparatus for tracking, between replications, an amount of synchronization of data in a distributed data processing system having plural application server computer systems interconnected via a network, each application server having a database application having a database and means for communicating data from the database via the network to plural client computer systems and to others of the application servers, the apparatus comprising:

means for generating an event message upon detection that copies of the database on different application servers are out of synchronization by a predetermined amount, said means for generating comprising:

sampling means for sampling each copy of the database;

first comparison means for determining whether corresponding samples match each other and for counting results thereof; and tion having a database and means for communicating data from the database via the network to plural client computer systems and to others of the application servers; and, replication tracking apparatus for tracking, between replications, an amount of synchronization of data, the replication tracking apparatus comprising generating means for generating an event message on detection that copies of the database on different application servers are out of synchronization by a predetermined amount, wherein the generating means comprises sampling means for sampling each copy of the database, first comparison means for determining whether corresponding samples match each other and for counting results thereof, and second comparison means for generating the event message if the number of matches counted by the first comparison means is less than an acceptance threshold representative of said predetermined amount of synchronization.

4. A method for tracking, between replications, an amount of synchronization of data in a distributed data processing system having plural application server computer systems interconnected via a network, each application server storing a copy of a database for access by one or more connected client computer systems, and communicating, via the network, data from the database to the clients and to others of the application servers, the method comprising the step of:

generating an event message upon detection that copies of the database on different application servers are out of synchronization by a predetermined amount, wherein said generating step comprises:

sampling each copy of the database;

determining whether corresponding samples match each other and counting results thereof; and generating the event message if a number of matches counted by said step of determining and counting is less than an acceptance threshold representative of said predetermined amount of synchronization.

5. A method as claimed in claim 4, further comprising displaying the event message.

* * * * *